March 19, 1946. F. X. ATZBERGER 2,396,810
WATER HEATER
Filed March 24, 1942
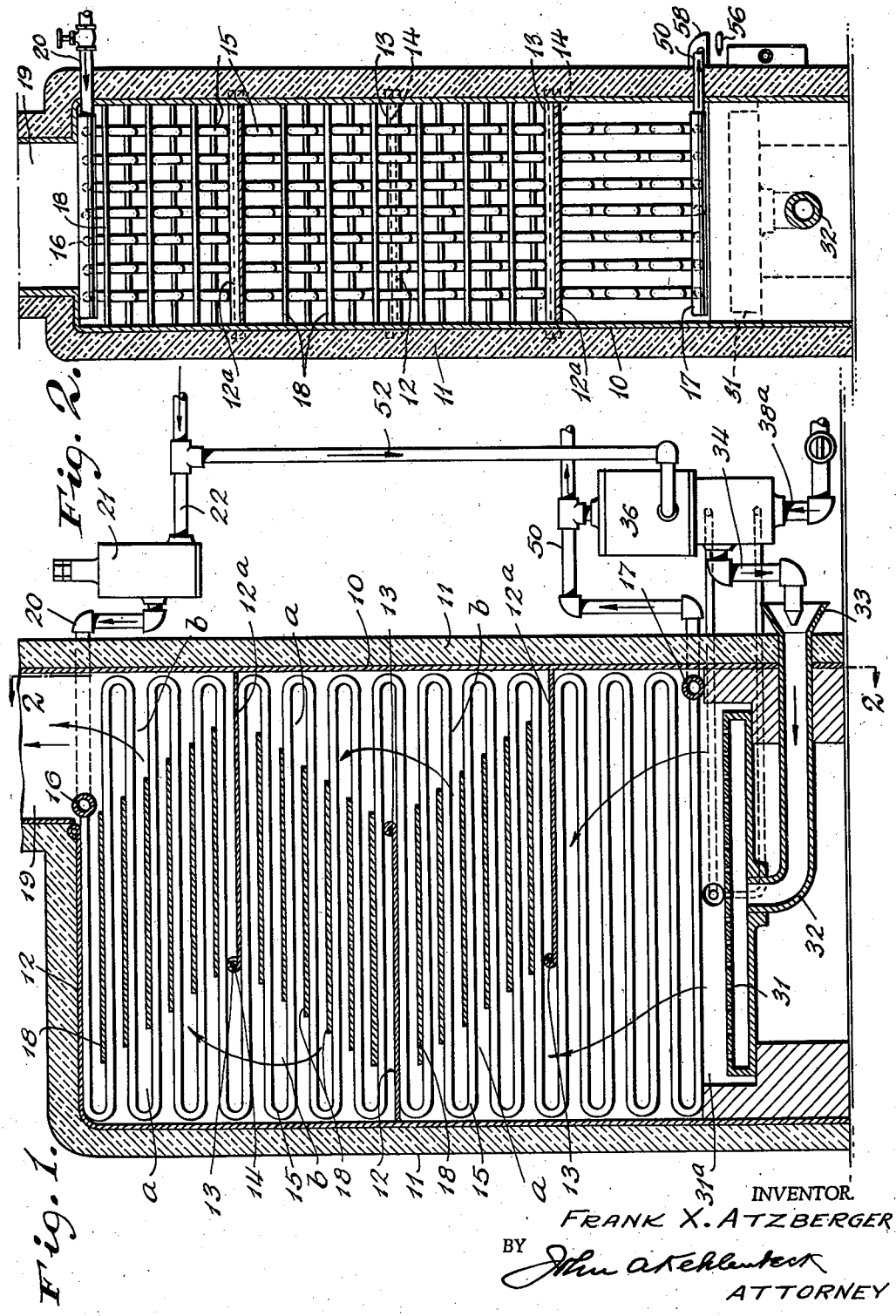

Patented Mar. 19, 1946

2,396,810

UNITED STATES PATENT OFFICE 2,396,810

WATER HEATER

Frank X. Atzberger, Ridgefield Park, N. J.

Application March 24, 1942, Serial No. 435,930

2 Claims. (Cl. 122—356)

The invention relates to water heaters and more particularly to heaters for supplying hot water for household and similar purposes.

The invention has for its object to provide a water heater of simple construction and operating in a novel manner to provide supplies of hot water in a minimum time period and with maximum efficiency.

Other objects will appear from the description hereinafter and the features of novelty will be pointed out in the claims.

In the accompanying drawing, which illustrates an example of the invention without defining its limits, Fig. 1 is a sectional elevation of the novel heater and its associated control means; and Fig. 2 is a vertical section on the line 2—2 of Fig. 1.

In the illustrated example, the water heater comprises a shell or housing 10 preferably made of copper or other suitable metal which is a rapid conductor of heat. The shell or housing 10 may be of any convenient dimensions and shape and preferably is of rectangular form, for instance, as shown in the drawing. To prevent undesirable heat losses by radiation, the outside of the shell 10 preferably is covered with a suitable heat insulating material 11 which may be fastened in place in any well-known way, it being understood that other methods of insulating the shell 10 against heat losses may be utilized if desired.

The shell or housing 10 is provided interiorly with horizontal baffle members or partitions 12 and 12a located in superimposed spaced parallel surface relation and projecting inwardly alternately in opposite directions from opposite walls of the shell 10 as illustrated in Fig. 1. The baffle members 12 and 12a are suitably secured to opposite walls of the shell 10 and terminate at intermediate points thereof in overlapping relation as shown in Fig. 1. The inner edges of the baffle members 12 and 12a preferably are coiled upon themselves in the form of tubular beads 13 for the accommodation of bolts 14 which extend through opposite walls of said shell 10 as illustrated in Fig. 2. The bolts 14 not only add to the rigidity of the shell 10 by bolting opposite walls thereof together, but in addition they serve to rigidly support the inner free edges of the baffle members 12 and 12a to prevent sagging thereof.

The heater further includes a coil 15 of suitable metal, such as copper, arranged in adjacent vertical sections located in spaced relation to each other as shown in Fig. 2 with each section comprising a length of tubing bent back and forth in the zigzag manner indicated in Fig. 1, and extending transversely across the shell 10 from one wall to the opposite wall thereof. Each section of zigzag tubing is connected at one end to a conventional inlet header 16 at the top of the casing 10 and at the other end to a conventional outlet header 17 located at the bottom of said casing 10 and flow of fluid through all the sections of the coil is controlled in any convenient manner as by means of a suitable hand operated valve. The tubing in each of the sections of the coil is arranged in surface engagement with the lower faces of the baffle members 12 and 12a and is fastened thereto in any convenient manner as by soldering or otherwise. With this arrangement the several sections comprising the coil 15 are suspended from the baffle members 12 and 12a as shown in Figs. 1 and 2. Between each pair of baffle members 12 and 12a the lengths of tubing included in the coil are in surface engagement with and attached to baffle plates 18, the latter being arranged in staggered relation in opposite alternate directions with respect to each other to provide the zigzag arrangement illustrated in Fig. 1. The baffle plates 18 extend transversely across the heater, as shown in Fig. 2, and because of their staggered arrangement in opposite directions provide open spaces between their opposite free edges and the walls of the casing 10 which converge upwardly at one edge of said baffle plates 18 and diverge upwardly at the opposite edges thereof as indicated at $a$ and $b$ in Fig. 1. The uppermost upwardly diverging space $b$ communicates with an outlet or stack 19 for the escape of combustion gases and the like.

In practice, the products of combustion or hot gases from the ignited burner 31 will rise within the casing 10 and pass over the lowermost portions of the coil 15 into engagement with the lowermost baffle member 12a and will be deflected thereby to rise with other portions of said products of combustion in the lowermost space $a$ into engagement with the first group of baffle plates 18 and into contact with the lowermost baffle member 12. The hot gases, or in other words, the products of combustion will thereby be deflected by said baffle plates 18 and baffle member 12 to the right in Fig. 1 so as to pass along and in contact with the contiguous tubing of the coil 15 and into the lowermost space $b$. From the latter the hot gases or products of combustion will pass upwardly into the intermediate space $a$ and into contact with the intermediate group of baffle plates 18 and the second baffle member 12ª and will be deflected thereby toward the left in Fig. 1 along and in contact with the contiguous portions of the coil 15 as will be apparent. The hot gases or products of combustion thus deflected will pass from the intermediate space b upwardly into the uppermost space a into contact with the uppermost group of baffle plates 18 and with the upper baffle member 12. This will cause the hot gases or products of combustion to be deflected by said last-mentioned baffle plates 18 and the upper baffle member 12 to the right in Fig. 1 along the portions of the coil 15 located at the top of the heater and out through the outlet or stack 19.

With this arrangement it will be noted that the hot gases or products of combustion are directed upwardly in a sinuous path and are caused to directly contact with all portions and sections of the heating coil 15 so that the water contained in said coil 15 will be quickly and adequately heated to the desired extent.

The novel water heater is practically instantaneous in action due to the fact that all parts of the heating coil 15 are directly engaged by the hot gases or products of combustion developed by the burner 31, and because said hot gases or products of combustion are guided over a sinuous path in said heater to remain in contact with all portions of the heating coil 15 for an extended period.

The novel heater is simple in construction and once it has been set up in operative arrangement requires no particular skill in its operation or supervision.

Various changes in the specific forms shown and described may be made within the scope of the claims without departing from the spirit of the invention.

I claim:

1. A water heater of the kind described comprising an upright metallic shell having an outlet for products of combustion at its upper end, metallic baffle members located in superimposed spaced relation and projecting inwardly from opposite walls of said shell in alternate sequence and terminating at intermediate parts thereof in overlapping position, groups of spaced metallic baffle plates located between said baffle member and arranged in staggered relation in opposite directions in alternative groups, a continuous water coil of tubing comprising zigzag sections arranged in spaced upright relation in connection with each other, said water coil having a water inlet at its upper end and a water outlet at its lower end, predetermined tubular portions of said coil being secured in surface engagement with said baffle members whereby said coil is suspended therefrom, and other predetermined tubular portions of said coil being secured in surface engagement with said baffle plates, a fuel burner located beneath said coil for developing hot gases which are diverted over a sinuous upward path by said baffle members and baffle plates to said outlet whereby all parts of said water coil are directly engaged by said hot gases to quickly heat the water contained in said coil, and means for controlling the fuel and water supplies to said heater.

2. A water heater of the kind described comprising an upright metallic shell having an outlet at its upper end, metallic baffle members located in superimposed spaced relation and projecting inwardly from opposite walls of said shell in alternate sequence, said baffle members overlapping each other and terminating at intermediate points of said shell, a continuous water coil of tubing having predetermined portions thereof in surface connection with said baffle members whereby said coil is suspended in said shell, said coil having a water inlet at its upper end and a water outlet at its lower end, groups of spaced metallic baffle plates secured to other predetermined portions of said coil in staggered relation in opposite directions between said baffle members, and a fuel burner located beneath said coil for developing hot gases which are diverted over a sinuous path by said baffle members and baffle plates to said outlet whereby all parts of said coil are directly engaged by said hot gases to quickly heat the water in said coil.

FRANK X. ATZBERGER.